Nov. 17, 1970 H. EINSTEIN 3,541,336
PHOTOELECTRIC GAS MONITOR HAVING EITHER REFLECTIVE OR ABSORBING
PLATE AT ONE END OF SAMPLE TUBE
Filed Nov. 8, 1967 2 Sheets-Sheet 2

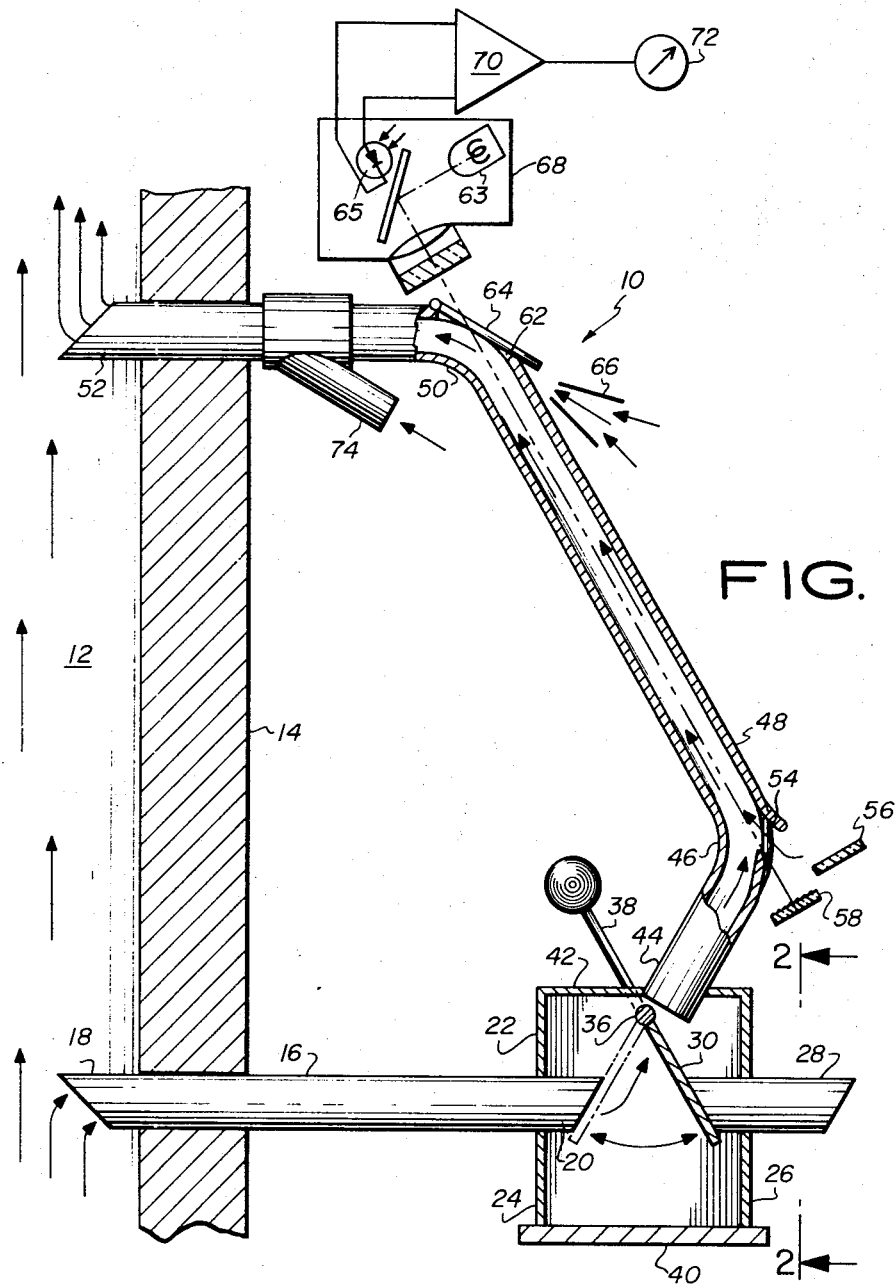
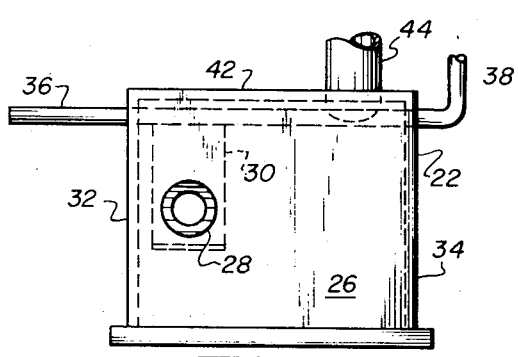

INVENTOR.
HARRY EINSTEIN
BY Lawrence I. Lerner
ATTORNEY

United States Patent Office 3,541,336
Patented Nov. 17, 1970

3,541,336
PHOTOELECTRIC GAS MONITOR HAVING EITHER REFLECTIVE OR ABSORBING PLATE AT ONE END OF SAMPLE TUBE
Harry Einstein, 25 Midvale Drive, Springfield, N.J. 07081
Filed Nov. 8, 1967, Ser. No. 681,517
Int. Cl. G01n 21/12
U.S. Cl. 250—218
15 Claims

ABSTRACT OF THE DISCLOSURE

Gas monitoring apparatus for detecting the quantity and quality of particles and other contaminants suspended in exhaust gases of the like which operates by shunting off a portion of the gases from a flue, passing them through a sensing tube and photoelectrically sensing the presence of particles in the gas. A photocell detector is placed outside of the sensing tube and senses the full length of the sensing tube. Gas is drawn through the tube by the natural draft aided as necessary by the provision of a separate air source provided at a point after the tested gas has passed through the tube. The source of air can also be placed adjacent to the hole where the photocell detector is positioned so that all the gases in the tube are diverted away from the hole. The photocell detector contains its own light source and when testing for black particles, a reflector is placed at the end of the tube opposite from the photocell so that the photocell measures the amount of reflected light, which of course is diminished by the number of black particles in the gas. If the reflector is removed or covered, then the photocell detector with appropriate changes in the light source and sensitivity will measure the amount of light reflected by white particles in the gas. An ultraviolet light source can also be utilized for testing other contaminants including normally invisible gas in the test gas. The particle detector can be calibrated against the ambient air by means of a valving system at the inlet to the detecting tube operative to cut off test gas and to allow the ambient air to enter the sampling tube so as to provide a zero reference.

This same valving arrangement can be used in conjunction with light filters of known transparencies to set predetermined reference levels.

The inlet to the detector is provided with means for allowing easy cleaning of the tubes and portions of the inlet which would collect the most sediment, and the inlet is further designed to prevent contamination of the test gases with sediment from prior testing. The inlet is further designed to permit easy access to the flue.

HISTORY OF THE INVENTION

Air pollution has become one of the major problems of our day. Because of this, it has become increasingly more important to determine the sources of pollutents and to thereby learn how to control these sources to limit the contamination of the air we breathe.

Thus, it would be extremely desirable to have a gas detector which could continuously monitor gases in the known places where contamination is generated such as flues, stacks, and the like. Further, it would be desirable to have a particle detector which could analyze or measure the exhaust system of a motor vehicle to test at inspection stations, whether the motor vehicle is operating efficiently in limiting contaminants in the exhaust gases. One of the obvious problems in this type of system is that there is a buildup of sediment from the dirty gases being measured which tends to foul an instrument and cause inaccurate readings. Thus, there must be provided means for continuously maintaining a detector free of collected contamination. Still further, there must be provided means for zeroing the detector so that the test gas can be measured against the ambient conditions.

Thus, it is desirable to determine the presence of white particles as opposed to black particles. Further, it is desirable to determine those contaminants which are sensitive to ultraviolet light. In this type of system, the only element at which errors can be caused is the photocell system. Thus, it would be extremely desirable to have the photocell system outside of the actual testing portion of the apparatus so that it can be easily serviced and, further, will not be affected by the contamination gases passing through the testing part of the apparatus.

SUMMARY OF THE INVENTION

The invention comprises gas monitoring apparatus having a straight length of tube with an inlet and outlet and a means for drawing air through the tube. A photocell is located outside of the tube but positioned adjacent to the outlet end of the testing portion of the tube. The tube is provided with an opening at its outlet so that the photocell sensor, which may have its own source of light, can detect the amount of light reflected back to the photocell detector. A reflector is placed at the inlet end of the tube so that light transmitted from the photocell detector along the length of the testing portion of the tube will be reflected back to the photocell detector diminished only by that amount of light absorbed by the black particles in the gases being detected. If the reflector is removed, then the photocell detector will detect only that amount of light reflected by white particles in the gases being detected. Both the reflector and the photocell are outside of the path of the testing gases so as to prevent contamination thereof. Where there is any chance of contamination or deposit of particles on the photocell detector or its reflector, an air wash is used to keep these elements clean. At the inlet end of the tube, there is provided an open space which can collect sediment while remaining outside of the ordinary path of gases being tested. The open space is formed in a suitable valve box which can be cleaned at appropriate intervals. At this valve box, there is also provided a separate inlet to receive ambient air with a valving arrangement to enable one to shut off the test gases and allow ambient air to pass through the testing tube to provide for the detector a zero or other reference level signal. The ambient air inlet also acts, when desired, as a means for access to an inlet tube for the unit so as to allow cleaning of the inlet tube at appropriate intervals and easy access to flue gases for laboratory samples. The forced air utilized adjacent to the outlet end of the testing tube draws air uniformly through the testing tube and also is utilized to prevent sediment from forming on the photocell apparatus by diverting all the test gases away from the photocell apparatus.

For the purpose of illustrating the invention, there are shown in the drawings forms which are presently preferred; it being understood, however, that this invention is not limited to the precise arrangements and instrumentalities shown.

FIG. 1 is a partially broken away view of one form of the present invention utilized to test flue gases.

FIG. 2 is an end view of the inlet box and valve arrangement of FIG. 1 taken along lines 2—2.

Figure 3:
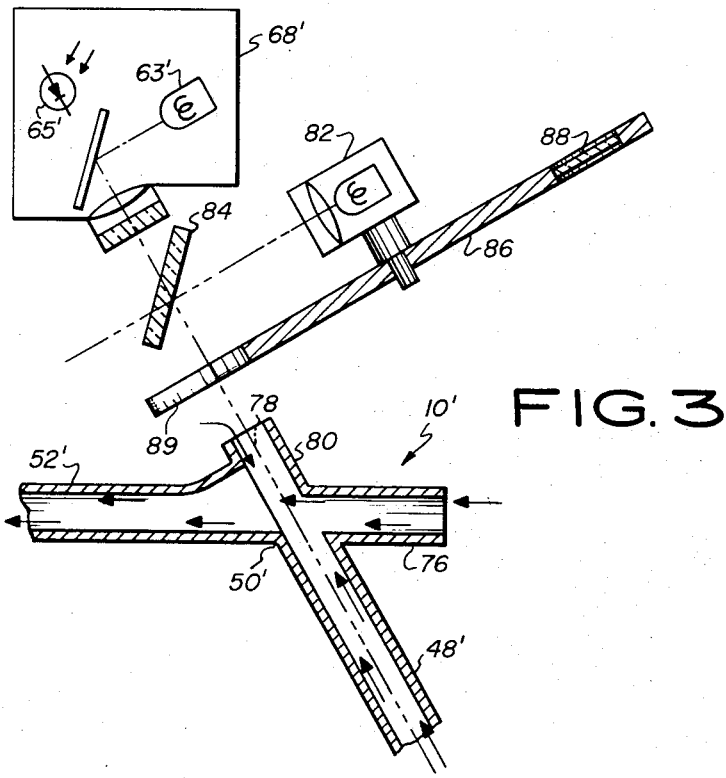
FIG. 3 is a second embodiment showing a different form for the outlet end of the testing tube.

In FIG. 1, there is shown gas monitoring apparatus built in accordance with the principles of the present invention and generally designated by the numeral 10. The apparatus 10 is utilized to detect gases in a flue or stack 12 having a side wall 14. An inlet tube 16 passes through the wall 14. The inlet tube 16 draws gases through one end 18, which gases are flowing up through the stack. The other end 20 of the inlet tube 16 extends into and is supported within a valve box 22. The valve box 22 has opposed side walls 24 and 26. The inlet tube 16 extends through side wall 24 and an ambient air tube 28 is mounted in side wall 26 axially aligned with inlet tube 16.

The valve box 22 has a flap valve 30 supported in the side walls 32 and 34 of the valve box 22 through a pivot rod 36 having a weighted arm 38 at the end thereof. It will be understood that in the position shown in FIG. 2, the flap valve 30 can be moved by rotation of weighted arm 38 to a position wherein ambient air tube 28 is closed and inlet tube 16 is open as best shown in FIG. 1 or, oppositely, inlet tube end 20 can be covered by flap 30 and, therefore, ambient air tube 28 will be open. Further, it should be noted that if rod 36 is moved to the right as shown in FIG. 2, flap 30 will uncover both tubes 28 and 16. Then, if one wishes to clean out tube 16, one need merely clean it through ambient air tube 28. This also allows access to the flue 12 for measurement of flue gas velocity as well as the withdrawal of gas samples for laboratory testing.

Valve box 22 has a removable bottom wall 40 which is used to remove accumulated sediment which would fall to the bottom of the valve box 22 during operation of the detector 10.

The top wall 42 of the valve box 22 has a conduit 44 mounted thereon which, at bend 46 is integral with a longitudinally extending straight tube 48 which for purposes of this specification will be called the testing or sampling tube. Testing tube 48 extends from bend 46 to bend 50 at the outlet end of testing tube 48. Bend 50 joins testing tube 48 to an outlet tube 52 which extends back through the wall 14 of stack 12 to return the gases to the stack. At the wide curvature portion of bend 46 there is provided a hole 54. Behind the hole is a retro reflector 58. Ambient air is drawn through hole 54 during operation of the apparatus 10 which air aids to prevent accumulation of sediment on reflector 58'. A non-reflective cover 56 is provided to cover reflector 58 when the apparatus is utilized to measure white particles.

At the wide curvature portion of bend 50 there is found another opening 62 covered with a suitable glass 64. An air jet 66 is positioned to maintain the surface of glass 64 free of sedimentation.

A photoelectric sensing unit 68 is provided behind glass 64. Sensing unit 68 is one having its own self-contained light source 63 and photocell 65. It is in effect a light transceiver in that it projects a light beam and senses the return of this beam from a reflected surface. Partial or complete interruption of the beam is translated into an electric signal by a suitable controller 70. It is to be understood that the transceiver 68 and controller 70 are standard articles of commerce and will not be described. A suitable source of transceivers is Nebetco Engineering, 1107 Chandler Ave., Roselle, N.J. The output signal from controller 70 is fed to a suitable metering device 72 so that one may read directly the contamination of the gases in stack 12.

Immediately after bend 50, in outlet tube 52, there is provided a source 74 of compressed air which is directed toward the outlet of outlet tube 52. This compressed air will act as a constant source for maintaining the flow of gases through the testing tube 48 at a desired velocity.

In operation, the flap 30 is moved to a position covering the end 20 of inlet tube 16 and compressed air source 74 draws air through the ambient air inlet tube 28 and conduit 44 into testing tube 48 at a desired velocity. The amount of solid particles in the ambient air is then measured on the meter 72 and this reading is then taken as a zero reading for the meter 72.

Then, the weighted arm 38 is rotated so that the flap 30 is in the position shown in FIG. 1. Gases within the stack 12 are then drawn through inlet tube 18, into valve box 22, through conduit 44 and thence through testing tube 48. Light transmitted from the transceiver 68 will pass through the glass 64 and testing tube 48 and be reflected by the retro reflector 58 back on to the photocell contained in transceiver 68. The new reading on meter 72 will give an exact measurement of the solid particles in the gases in stack 12.

It will be understood that if, non-reflective cover 56 is placed on reflector, then, a different transceiver 68 would be utilized, one having a greater sensitivity and perhaps a higher light source 63, so that the photocell 65 in the transceiver 68 would measure that amount of light which would be reflected by white particles in the gases passing through the testing tube 48. This would give a meter reading responsive to the amount of white particles in the gases. The glass 64 is continuously maintained free of sediment by reason of gas jets 66.

Further, it will be understood that in this type of system, the solid particles would move, by gravity, downwardly in the normal course of operation and there would be a tendency of particles to settle within the valve box 22. This is aided by the inclined position of tubes 44 and 48. As discussed previously, as such particles are deposited on the bottom wall 40 of valve box 22 they will be out of the normal flow path of gases through the apparatus 10. However, at regular intervals, it will be necessary to remove the bottom wall 40 to clean out the collected sedimentation.

In FIG. 3, there is shown a second form of the gas monitoring apparatus designated as 10' wherein the portion of the apparatus around bend 50 of FIG. 1 has been modified. Those portions of the apparatus 10' shown in FIG. 3 which are consistent with the embodiment shown in FIG. 1 will be indicated with prime numerals. Where changes have been made, new numerals will be added.

In the embodiment of FIG. 3, the apparatus 10' still includes the testing tube 48' joined at a bend 50' with an outlet tube 52'. However, the compressed air source 74 has been removed and a new compressed air source 76 has been provided at the end of the testing tube 48' which directs its air in a direction coaxial with the outlet tube 52'. An opening 78 is provided in place of the glass 52, which opening is axially aligned with the testing tube 48' and is formed by an extension 80 of tube 48' immediately in front of the tube which forms the structure for the first air source 76. It will thus be understood that particles, as they move up the testing tube 48' will be diverted into the outlet tube 52' by air from the compressed air source 76 and will not leave the opening 78. Since no particles or gases can leave the opening 78 bacause of the compressed air source 76, there is no need to have a glass 64 thereon and therefore, this particular element has been eliminated from the embodiment of FIG. 3.

As was stated previous in respect to the embodiment of FIG. 1, there is a need for determining the amount of white particles as well as the amount of black particles in a given gas sampling. It can easily be understood that with respect to the black particles there is a given amount of light required to be transmitted by the light source 63' in the transceiver 68'. However, if one wished to measure the amount of white particles in the gases passing through the sampling tube 48', then there would be needed an additional amount of light as, it can be understood, when measuring white particles, the retro reflector 58' (not shown) has been covered by non-reflective cover 56' (not shown). Then, it is only that amount of light which is reflected by white particles passing through the testing or sampling tube 48' that is returned to the transceiver 68'. Thus, in order to make the instrument more sensitive, and to be able to read the amount of the returned light, a second source of light is required. For this purpose, there is shown a light source 82 mounted perpendicular to the axis of transceiver 68' and directed at a semitransparent mirror 84 which will reflect the light from source 82 along the axis of the testing tube 48' and will further allow light from the transceiver 68' to pass directly therethrough.

Figure 4:
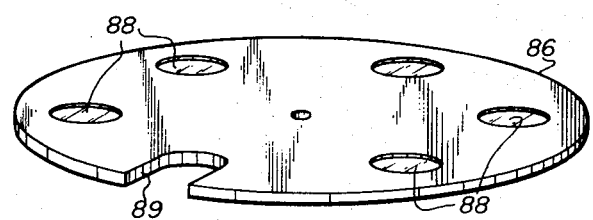
FIG. 4 is a perspective view of the light filter shown in FIG. 3.

Between the semitransparent mirror 84 and the opening 78, there is positioned a light filter holder 86 having a plurality of light filters 88 thereon and an open space 89. The light filters are positioned regularly about the surface of the support 86 so that, at any time one of the light filters 88 or the open space 89 is positioned axially aligned with the axis of the sampling tube 48' and transceiver 68'. The light filters 88 as best shown in FIG. 4, can be of varying degrees of transparency and one may be an ultraviolet light filter. For example, it may be desirable to detect radiation sensitive particles under black or ultraviolet light and accordingly, one of the filters 88 would only pass ultraviolet light.

Figure 5:
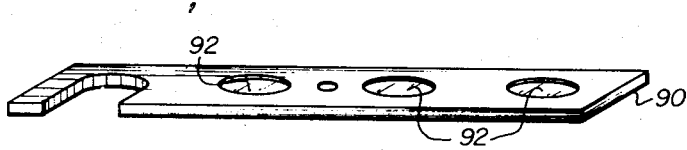
FIG. 5 is a perspective view of a different form of light filter which could be utilized in accordance with the teachings of the present invention.

The exact form of the filter support 86 is not important. The support 86 may be designed for rotation as shown in FIGS. 3 and 4, or as shown in FIG. 5, a rectangular support 90 supporting various light filters 92 may be utilized. The support 90 would be substituted for the support 86 in FIG. 3 and would be moved longitudinally to index the light filters 92 into position coaxial with the axis of testing tube 48'.

In operation, ambient air is tested in the apparatus 10'. First, the meter is set with the space 89 on the filter source coaxial with the testing tube 48'. This gives a zero reference for the system. Then different filter 88 having different degrees of transparency (10%, 20%, 30%, etc.) are axially aligned with the testing tube 48' to set smoke reference levels. Then the space 89 is aligned with the testing tube 48' and the apparatus is ready for testing the gases.

In more improved apparatus, the intake tube 16 and valve housing 22 can be periodically automatically cleaned by air. Smoke reference levels previously discussed can also be set automatically by automatic means for controlling the valve plate 30 and, therefore, the meter 72 can be adjusted automatically electronically. It will be understood that recording devices are easily incorporated in this system with periodic reference adjustment checks.

Although the preferred embodiments utilize transceivers of the types shown, it is easily understood that it would be possible to utilize a separate light source positioned in place of the reflector 58 within the scope of the teachings of the present invention.

The present invention may be embodied in other specific forms without departing from the spirit or essential attributes thereof and, accordingly, reference should be made to the appended claims rather than to the foregoing specification as indicating the scope of the invention.

I claim as my invention:

1. Gas monitoring apparatus comprising a straight sampling tube having a longitudinal axis, an inlet tube, connected to said sampling tube at an inlet end of the sampling tube, an outlet tube connected to the outlet end of said sampling tube, means for drawing gases through said inlet tube and sampling tube at a preselected velocity, a radiation sensitive detector mounted at one end of said sampling tube axially aligned with the longitudinal axis of said sampling tube, a source of radiation also mounted at said one end of said sampling tube and axially aligned with said longitudinal axis of said sampling tube, selective reflective means at the other end of said sampling tube to reflect radiation from said radiation source or absorb radiation from said radiation source in a predetermined manner, and monitoring means controlled by said radiation sensitive detector to convert the output signal of said detector into a recognizable signal indicative of the amount of contaminants in the gas being tested.

2. The gas monitoring apparatus of claim 1 wherein said sampling tube and said outlet tube are part of a continuous tube, said continuous tube having a bend at said outlet end of said sampling tube, said bend having an outer wider curvature portion, said continuous tube having a hole being axially aligned with the longitudinal axis of said sampling tube, said radiation sensitive detector and said source of radiation being mounted outside of said continuous tube adjacent said hole.

3. The gas monitoring apparatus of claim 2 wherein said draft means includes a source of pressurized air positioned adjacent said hole and being operative to force air along the axis of said outlet tube, said source of pressurized air being thereby operative to prevent gases from flowing from said sampling tube and passing out through said hole.

4. The gas monitoring apparatus of claim 2 including a glass cover for such hole, and a second source of compressed air operative to blow air across the said glass piece so as to prevent the accumulation of sediment thereon.

5. The gas monitoring apparatus of claim 2 wherein said sampling tube is connected to said inlet tube at a second bend portion, said second bend portion having a larger curvature portion, a second hole being formed in said larger curvature portion of said second bend axially aligned with the longitudinal axis of said sampling tube, and said selective reflection means including a light reflecting device positioned outside of said continuous tube axially aligned with said sampling tube longitudinal axis adjacent said second hole.

6. Gas monitoring apparatus comprising a straight sampling tube having a longitudinal axis and inlet tube connected to said sampling tube at an inlet end of the sampling tube, an outlet tube connected to the outlet end of said sampling tube, means for drawing gases through said inlet tube and sampling tube at a preselected velocity, a radiation sensitive detector mounted at one end of said sampling tube axially aligned with the longitudinal axis of said sampling tube, a source of radiation mounted at one end of said sampling tube and axially aligned with said longitudinal axis of said sampling tube, monitoring means controlled by said radiation sensitive detector to convert the output signal of said detector into a recognizable signal indicative of the amount of contaminants in the gas being tested, said sampling tube and said outlet tube being part of a continuous tube, said continuous tube having a bend at said outlet end of said sampling tube, said bend having an outer wider curvature portion, said continuous tube having a hole being axially aligned with the longitudinal axis of said sampling tube, said radiation sensitive detector and said source of radiation being mounted outside of said continuous tube adjacent said hole, said sampling tube being connected to said inlet tube at a second bend portion, said second bend portion having a larger curvature portion, a second hole being formed in said larger curvature portion of said second bend axially aligned with the longitudinal axis of said sampling tube, a light reflecting device positioned outside of said continuous tube axially aligned with said sampling tube longitudinal axis adjacent said second hold, and cover means to make said light reflective device totally nonreflective.

7. The gas monitoring apparatus of claim 2 including a second source of radiation mounted adjacent said first source of radiation, and means for selectively transmitting the output of either or both of said sources of radiation along the longitudinal axis of said sampling tube through said hole.

8. The gas monitoring apparatus of claim 7 wherein said first source of radiation is mounted with its output along the longitudinal axis of said sampling tube, said second source of radiation being mounted with its axis perpendicular to the longitudinal axis of said sampling tube, and a half-way mirror mounted at a 45 degree angle with respect to the axis of said sampling tube and at the crossover point between the axis if said second source of radiation and said longitudinal axis of said sampling tube to transmit both of the outputs of said first and second sources of radiation along the axis of said sampling tube.

9. The gas monitoring apparatus of claim 2 including light filter means, said light filter means being selectively interposable between said hole and said radiation sensitive detector to set reference levels for said monitoring means.

10. The gas monitoring apparatus of claim 9 wherein said light filter is mounted on a frame, said frame having additional light filters mounted thereon, said frame being movable to place different filters between said radiation sensitive detector and said hole along the longitudinal axis of said sampling tube.

11. The gas monitoring apparatus of claim 1 including air intake means, said air intake means being selectively connected to said sampling tube, said air intake means being operative to provide, when connected to said sampling tube, a source of ambient air for obtaining a reference signal for said metering means, and selective valve means for selectively connecting said air intake means to said sampling tube.

12. Gas monitoring apparatus comprising a straight sampling tube having a longitudinal axis, an inlet tube connected to said sampling tube at an inlet end of the sampling tube, an outlet tube connected to the outlet end of said sampling tube, means for drawing gases through said inlet tube and sampling tube at a preselected velocity, a radiation sensitive detector mounted at one end of said sampling tube axially aligned with the longitudinal axis of said sampling tube, a source of radiation mounted at one end of said sampling tube and axially aligned with said longitudinal axis of said sampling tube, monitoring means controlled by said radiation sensitive detector to convert the output signal of said detector into a recognizable signal indicative of the amount of contaminants in the gases being tested, air intake means, said air intake means being selectively connected to said sampling tube, said air intake means being operative to provide, when connected to said sampling tube, a source of ambient air for obtaining a reference signal for said monitoring means, selective valve means for selectively connecting said air intake means to said sampling tube, said selective valve means including a housing, said housing having mounted therein said inlet tube and said air intake means at a point above the bottom thereof whereby said selective valve means also acts as a means for collecting settled contamination without clogging the inlet tube and sampling tube.

13. The gas monitoring apparatus of claim 12 wherein said inlet tube and air intake means are both tubes which are axially aligned with each other at said selective valve means, said selective valve means including means for allowing direct access between said air intake means and said inlet tube whereby said inlet tube may be cleaned by extending a cleaning means through said air intake means directly into said inlet tube.

14. The gas monitoring apparatus of claim 11 wherein said selective valve means includes a flap valve, said flap valve having two operative positions, the first of said operative positions closing said air intake means and opening said inlet tube, the second of said operative positions being closing said inlet tube and opening said air intake means.

15. The gas monitoring apparatus of claim 1 wherein said means for drawing gases through said inlet tube and sampling tube at said pre-selected velocity comprises a source of compressed air and means for connecting said source of compressed air to said outlet tube for establishing a draft flow through said sampling tube.

References Cited

UNITED STATES PATENTS

| | | | |
|---|---|---|---|
| 1,969,626 | 8/1934 | Simon et al. | 88—14 |
| 2,301,367 | 11/1942 | Cahusac et al. | 88—14 |
| 2,311,374 | 2/1943 | Farmer et al. | 250—218 |
| 2,649,011 | 8/1953 | Black | 88—14 |
| 2,964,640 | 12/1960 | Wippler | 88—14 |
| 2,042,095 | 5/1936 | Grant | 356—207 |
| 2,620,385 | 12/1952 | Grant | 356—207 |

WALTER STOLWEIN, Primary Examiner

M. ABRAMSON, Assistant Examiner

U.S. Cl. X.R.

356—207